(12) United States Patent
Wang et al.

(10) Patent No.: US 7,408,699 B2
(45) Date of Patent: Aug. 5, 2008

(54) ELECTROPHORETIC DISPLAY AND METHODS OF ADDRESSING SUCH DISPLAY

(75) Inventors: Xiaojia Wang, Fremont, CA (US); David Morris, San Jose, CA (US); Fei Wang, Fremont, CA (US); Andrew Ho, Atherton, CA (US)

(73) Assignee: Sipix Imaging, Inc., Freemont, CA (US)

( * ) Notice: Subject to any disclaimer, the term of this patent is extended or adjusted under 35 U.S.C. 154(b) by 38 days.

(21) Appl. No.: 11/528,714

(22) Filed: Sep. 26, 2006

(65) Prior Publication Data

US 2007/0076289 A1 Apr. 5, 2007

Related U.S. Application Data

(60) Provisional application No. 60/721,859, filed on Sep. 28, 2005.

(51) Int. Cl.
*G02B 26/00* (2006.01)
*G09G 3/34* (2006.01)
*G06F 3/041* (2006.01)

(52) U.S. Cl. .................. 359/296; 345/107; 345/173

(58) Field of Classification Search ............ 359/296, 359/452, 245; 345/30, 52, 60, 80, 105, 107; 345/204, 84, 173, 174, 182; 349/113, 156, 349/167; 427/58, 146
See application file for complete search history.

(56) References Cited

U.S. PATENT DOCUMENTS

| | | | | |
|---|---|---|---|---|
| 4,639,720 A * | 1/1987 | Rympalski et al. | .......... | 345/174 |
| 5,930,026 A | 7/1999 | Jacobson et al. | ............ | 359/296 |
| 5,961,804 A | 10/1999 | Jacobson et al. | ............ | 204/606 |
| 6,473,072 B1 * | 10/2002 | Comiskey et al. | ........... | 345/173 |
| 6,506,438 B2 * | 1/2003 | Duthaler et al. | ............... | 427/58 |
| 6,672,921 B1 | 1/2004 | Liang et al. | ................... | 445/24 |
| 6,738,050 B2 * | 5/2004 | Comiskey et al. | ........... | 345/173 |
| 6,930,818 B1 | 8/2005 | Liang et al. | ................. | 359/296 |
| 6,933,098 B2 | 8/2005 | Chan-Park et al. | .......... | 430/311 |
| 2004/0182711 A1 | 9/2004 | Liang et al. | ................. | 204/606 |

OTHER PUBLICATIONS

Allen, K. (Oct. 2003). Electrophoretics Fulfilled. *Emerging Displays Review: Emerging Display Technologies, Monthly Report—Oct. 2003*, 9-14.

Bardsley, J.N. & Pinnel, M.R. (Nov. 2004) Microcup™ Electrophoretic Displays. *USDC Flexible Display Report*, 3.1.2. pp. 3-12—3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

Chen, S.M. (Jul. 2003) The Applications for the Revolutionary Electronic Paper Technology. *OPTO News & Letters*, 102, 37-41. (in Chinese, English abstract attached, full translation available upon request).

(Continued)

*Primary Examiner*—Loha Ben
(74) *Attorney, Agent, or Firm*—Howrey LLP

(57) ABSTRACT

The present invention relates to electrophoretic displays and methods of addressing such displays. The displays and methods are especially suitable for large size electronic boards or signs.

17 Claims, 5 Drawing Sheets

OTHER PUBLICATIONS

Chen, S.M. (May 2003) The New Applications and the Dynamics of Companies. *TRI.* 1-10. (In Chinese, English abstract attached, full translation available upon request).

Chiang, et al (1979) A Stylus Writable Electrophophoretic Display Device. *SID Digest*, pp. 44-45.

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Candice. (Feb. 1, 2005) *Microcupt® Electronic Paper Device and Applicaiton.* Presentation conducted at USDC 4th Annual Flexible Display Conference 2005.

Ho, C.,& Liang, R.C. (Dec. 2003). *Microcup (R) Electronic Paper by Roll-to-Roll Manufacturing Processes.* Presentation conducted at FEG, Nei-Li, Taiwan.

Hopper, M. A. et al, "An Electrophoretic Display, its Properties, Model and Addressing", IEEE Transactions on Electron Devices, 26(8): 1148-1152 (1979).

Hou, J., Chen, Y., Li, Y., Weng, X., Li, H. And Pereira, C. (May 2004). Reliability and Performance of Flexible Electrophoretic Display by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes.* Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process.* Presentation at the Flexible Displays & Electronics 2004 of Intertech, San Fransisco, California, USA.

Liang, R.C. (Oct. 2004) *Flexible and Roll-able Display/Electronic Paper—A Technology Overview.* Paper presented at the METS 2004 Conference in Taipie, Taiwan.

Liang, R.C., (Feb. 2005) *Flexible and Roll-able Displays/Electronic Paper—A Brief Technology Overview.* Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., & Zang, H.M., & Chung, J. (Feb. 2003). *Passive Matrix Microcup(R) Electrophoretic Displays.* Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) "Format Flexible Microcup (R) Electronic Paper by Roll-to-Roll Manufacturing Process", Presentation conducted at the 14th FPD Manufacturing Technology EXPO & Conference.

Liang, R.C., & Tseng, S. (Feb. 2003). *Microcup(R) LCD, An New Type of Dispersed LCD by A Roll-to-Roll Manufacturing Process.* Paper presented at the IDMC, Taipei, Taiwan.

Mossman, M.A., et al. (2002) Grey Scale Control of TIR Using Electrophoresis of Sub-Optical Pigment Particles, *SID 02 Digest*, pp. 522.

Mossman, M.A., et al (2001) New Reflective Color Display Techniques Based on Total Internal Reflection and Subtractive Color Filtering. *SID 01 Digest*, pp. 1054, (2001).

Mossman, M.A. et al (2001) New Reflective Display Based on Total Internal Reflection in Prismatic Microstructure. *SID IDRC Proceedings*, pp. 311.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al., (Feb. 2006) *Inkjet Fabrication of Multi-Color Microcup® Electrophorectic Display.* the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, pp. 1587-1589.

Zang, H.M. (Feb. 2004). *Microcup Electronic Paper.* Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes.* Presentation conducted at the Advisory Board Meeting, Bowling Green State University, Ohio, USA.

Zang, H.M.Hou, Jack, (Feb. 2005) *Flexible Microcup® EPD by RTR Process.* Presentation conducted at 2nd Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

Zang, HM., Wang, W., Sun, C., Gu, H., and Chen, Y. (May 2006) Monochrome and Area Color Microcup® EPDs by Roll-to-Roll Manufacturing Processes. *ICIS ' 06 International Congress of Imaging Science Final Program and Proceedings*, pp. 362-365.

* cited by examiner

ELECTROPHORETIC DISPLAY AND METHODS OF ADDRESSING SUCH DISPLAY

The present application claims the benefit of U.S. Provisional Application 60/721,859, filed Sep. 28, 2005; the contents of which are incorporated herein by reference in its entirety.

FIELD OF THE INVENTION

The present invention relates to electrophoretic displays and methods of addressing such displays. The displays and methods are especially suitable for large size electronic boards or signs.

BACKGROUND OF THE INVENTION

The electrophoretic display (EPD) is a non-emissive device based on the electrophoresis phenomenon influencing the migration of charged pigment particles in a solvent, preferably a colored dielectric solvent. This type of display was first proposed in 1969. An electrophoretic display typically comprises a pair of opposed, spaced-apart plate-like electrodes, with spacers predetermining a certain distance between them. At least one of the electrodes, typically on the viewing side, is transparent. For the passive type of electrophoretic displays, row and column electrodes on the top and bottom plates, respectively, are needed to drive the displays. In contrast, an array of thin film transistors (TFTs) on the bottom substrate and a common, non-patterned transparent conductor plate on the top viewing substrate may be used for the active type electrophoretic displays.

An electrophoretic dispersion composed of a dielectric solvent and charged pigment particles dispersed therein is enclosed between the two electrode plates. When a voltage difference is imposed between the two electrode plates, the charged pigment particles migrate by attraction to the plate of polarity opposite that of the charged pigment particles. Thus, the color showing at the transparent plate, determined by selectively charging the electrode plates, may be either the color of the solvent or the color of the charged pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing times.

Electrophoretic displays of different pixels or cell structures have been reported previously, for example, the partition-type EPD [M.A. Hopper and V. Novotny, IEEE Trans. Electr. Dev., Vol. ED 26, No. 8, pp. 1148-1152 (1979)], the microencapsulated electrophoretic display (U.S. Pat. Nos. 5,961,804 and 5,930,026 and U.S. applications, Ser. No. 60/443,893, filed Jan. 30, 2003 and Ser. No. 10/766,757, filed on Jan. 27, 2004, now U.S. Pat. No. 7,184,197) and the total internal reflection (TIR) type of electrophoretic display using microprisms or microgrooves as disclosed in M.A. Mossman, et al, SID 01 Digest pp. 1054 (2001); SID IDRC proceedings, pp. 311(2001); and SID'02 Digest, pp. 522 (2002).

An improved electrophoretic display technology was disclosed in U.S. Pat. No. 6,930,818 (corresponding to WO01/67170), U.S. Pat. No. 6,672,921 (corresponding to WO02/01281) and U.S. Pat. No. 6,933,098 (corresponding to WO02/02/65215), the contents of all of which are incorporated herein by reference in their entirety. The improved electrophoretic display comprises isolated cells formed from microcups and filled with charged pigment particles dispersed in a dielectric solvent or solvent mixture. To confine and isolate the electrophoretic dispersion in the cells, the filled microcups are top-sealed with a polymeric sealing layer, preferably formed from a composition comprising a material selected from the group consisting of thermoplastics, thermoplastic elastomers, thermosets and precursors thereof. Most significantly, the microcup technology has made roll-to-roll manufacturing of electrophoretic displays, even large size electrophoretic displays, possible.

However, currently there are no commercially available low cost high resolution backplanes for driving large size electrophoretic displays. In addition, both direct drive with a dot matrix patterned electrode and active matrix drive with a TFT backplane need driving electronics that are too expensive for large size displays.

Mechanically movable electrode is considered one of the possible cost effective ways for the large size displays. Addressing an electrophoretic display with the combination of a stationary common electrode and a movable electrode to generate a local electric field was proposed by Chiang et al (see "A Stylus Writable Electrophoretic Display Device", SID 1979 Digest, page 44). The mechanism worked well in theory, but ran into difficulty in practical applications. The main obstacle is the poor electrical contact between the movable electrode and the surface of the electrophoretic display panel. When the movable electrode is in contact with the surface of the electrophoretic display panel, due to rigidity and surface roughness of both the movable electrode tip and the electrophoretic display panel, the interface is dominated by air pockets and as a result, there is very limited true contact area. The poor contact results in a significant loss of electric field intensity at the contact interface and diminishes the electric field intensity across the electrophoretic display panel. Typically, when-two stationary electrodes are used, an electrophoretic display panel can be driven at a field intensity of less than 1 V/um. However, when a movable electrode is used to replace one of the stationary electrodes, a much higher overall electric field intensity, over 20 V/um, may be needed to achieve any reasonable image change in the same electrophoretic display set-up.

One way to avoid this poor electric contact is to change the movable contact surface from conductive/dielectric to conductive/conductive. For example, in the latter scenario, a printed circuit board (PCB) can be used. The printed circuit board, with dot matrix conductive pattern on both sides that are connected through via holes, is laminated onto the electrophoretic display panel. The lamination secures the contact of one conductive surface of the printed circuit board with the dielectric surface of the electrophoretic display panel. The movable electrode, in this case, is in contact with the conductive pads on the other conductive surface of the printed circuit board. Since both of the contact surfaces are conductive, the contact resistance is negligible. Alternatively, conductive pads may be directly pre-deposited onto the electrophoretic display panel to form a secured bond between the pads and the display panel. The movable electrode is then in contact with the conductive pads to generate an electric field. However, in these methods, the resolution of the image is inevitably limited by the resolution of either the printed circuit board or the pre-deposited conductive pads.

SUMMARY OF THE PRESENT INVENTION

The objective of the present invention is to provide low cost display devices and driving methods for addressing such displays.

The first aspect of the present invention is directed to an electrophoretic display which comprises (i) an electrophoretic display panel sandwiched between a stationary electrode layer and a dielectric barrier layer and (ii) a movable element having at least a conductive surface or tip as the second electrode on the dielectric layer side. A non-conductive liquid is to be applied between the movable element and the dielectric layer during the writing/drawing process.

The movable element having at least a conductive surface or tip may be itself an electrode; but this is not required.

It is also noted that the term "electrophoretic display panel" broadly covers electrophoretic display panels prepared from any of the known technologies, such as the conventional partition type, the microcapsule-based type or the microcup-based type, illustrated in the Background of the Invention section above. The electrophoretic display panel typically comprises display cells (e.g., partition type cells, microcapsule-based cells or microcup-based cells) filled with an electrophoretic fluid which comprises charged pigment particles dispersed in a dielectric solvent or solvent mixture.

In the writing/drawing process, an electrical field is created between the conductive surface or tip of the movable element (on the dielectric layer side of the electrophoretic display panel) and the stationary electrode layer (on the opposite side of the electropheretic display panel), with the highest field intensity located at the contact point of the movable element. As the movable element moves across the surface of the dielectric barrier layer, the peak of the electric field moves with it. When the strength of the electric field across electrophoretic display panel between the contact point of the movable element and the stationary electrode is sufficient, the charged pigment particles would move, according to the polarity of the applied electric field, to form an image. Therefore as the movable element moves, images are formed due to the movement of the charged pigment particles under the influence of the electric field. Therefore the movement of the movable element provides the perception that images are being written/drawn on the electrophoretic display panel.

To ensure the electric field created by the movable element and the stationary electrode is efficiently applied to the electrophoretic fluid and is not lost due to the poor contact interface between the movable element and the dielectric barrier layer, a non-conductive liquid is applied or dispensed between the movable element and the dielectric barrier layer. The non-conductive liquid has the tendency to fill in any pores and surface irregularities on the dielectric surface of the display panel to extrude air pockets from the contact interface between the movable element and the dielectric surface of the display panel. Due to the intimate contact created between the liquid and the dielectric surface and between the liquid and the movable element, sufficient electric field strength can be allocated to the electrophoretic fluid.

Many non-conductive liquids are good dielectric materials with strong polarization ability in an electric field that can minimize the impact of adding an extra liquid layer to the multi-layer display panel between the conductive surface or tip of the movable element and the stationary electrode layer. The portion of the electrical field strength allocated to the added liquid layer is negligible compared to the electric field strength experienced by the electrophoretic fluid. Depending on the properties of the non-conductive liquid used, the total electric field needed to address an electrophoretic display panel with a movable element having at least a conductive surface or tip can be reduced drastically. The selection criterion for the non-conductive liquid is that the non-conductive liquid should not cause swelling or permeation through the dielectric layer.

The other advantage of the use of a non-conductive liquid between the movable element and the dielectric barrier layer of the electrophoretic display panel is to ease the mechanical strength requirement of the display panel. It eliminates the need of contact pressure between the movable element and the dielectric barrier layer of the display panel. It also reduces the requirement on surface smoothness of the movable element and abrasion resistance of the dielectric barrier layer.

Other advantages of this invention include the resolution of the image controlled by the size of the liquid path which can be very small.

The second aspect of the present invention provides methods of addressing such an electrophoretic display.

As stated, the non-conductive liquid can be applied by the movable element to create contact between the conductive surface or tip of the movable element and the dielectric surface of a display panel. The liquid can also be dispensed by the movable element (such as an inkjet head) and the liquid would remain at the dispensing site after the movable element has moved to other locations.

A movable element in the form of a roller or the like may move to be in contact with the non-conductive liquid droplets to drive the charged pigment particle at the contact point. The dispensing speed of the movable element may exceed the moving speed of the charged pigment particles, thus providing significant writing speed enhancement.

DETAILED DESCRIPTION OF THE PRESENT INVENTION

Figure 1:
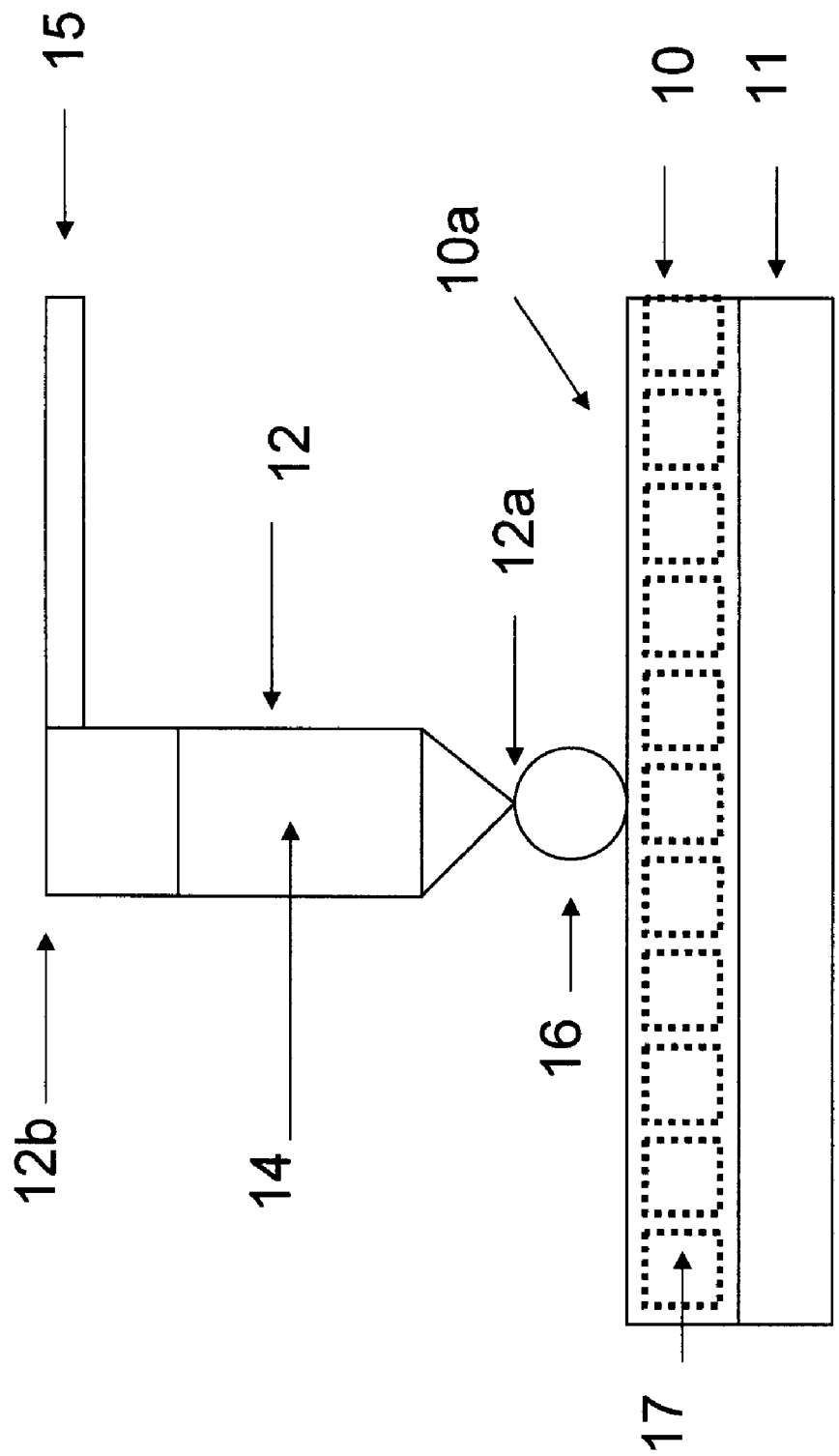
FIGS. 1-5 illustrate different designs of electrophoretic displays of the present invention.
Figure 2:
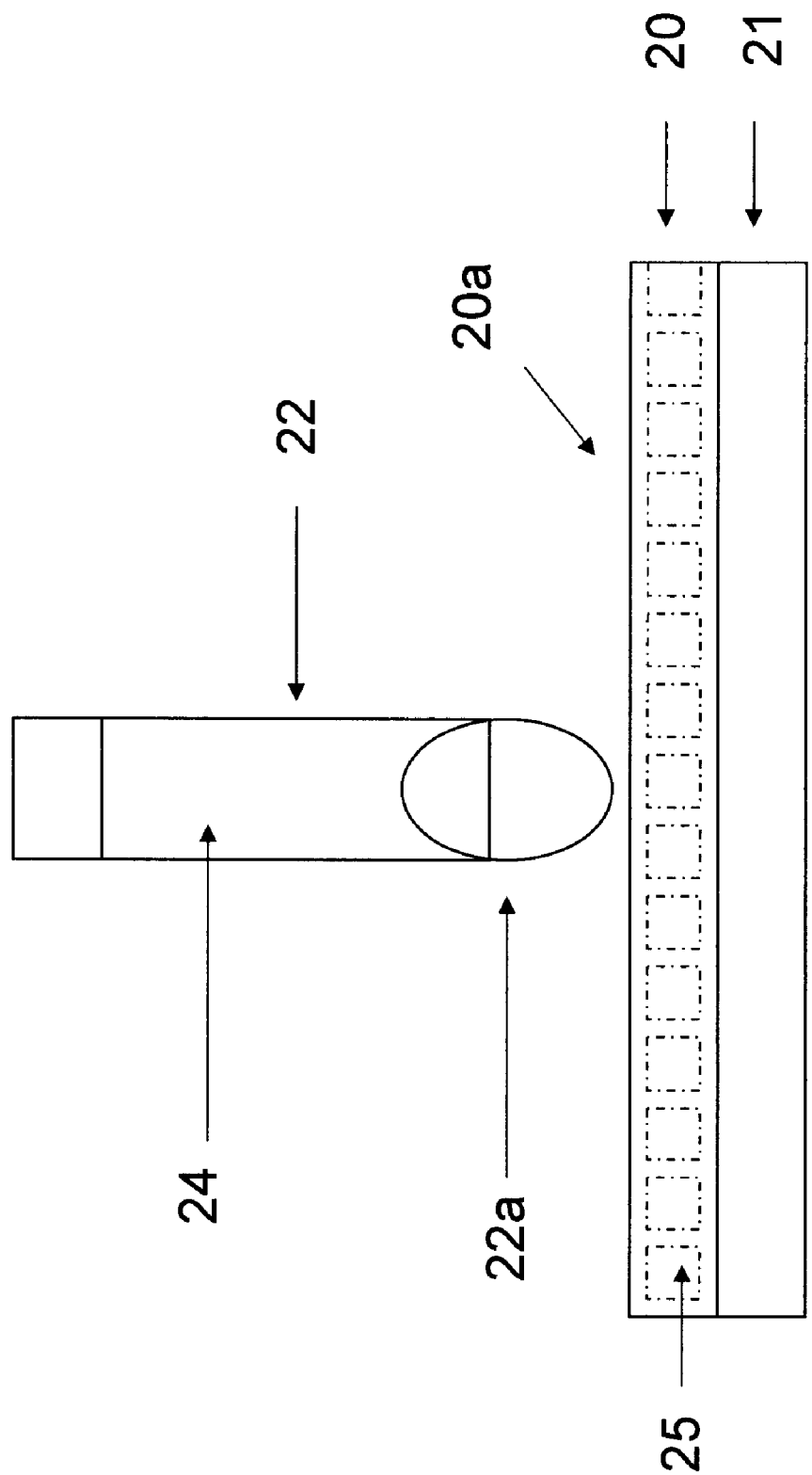

FIG. 1 illustrates an electrophoretic display of the present invention which comprises a stationary electrode layer (11), an electrophoretic display panel (10) comprising display cells (17), a movable element (12) having a conductive tip and a non-conductive liquid (14) filled in the body of the movable element. One side of the display panel has a dielectric surface (10a). The liquid released from the movable element in the form of droplets causes contact between the electrophoretic display panel (10) and the conductive tip of the movable element (12) which in turn forms a temporary yet an integrated electrical field between the stationary electrode layer (11) and the conductive tip of the movable element (12). The movable element comprises two parts 12a and 12b. The part, 12a, as stated, is conductive and is connected to a voltage source (not shown). The other part, 12b, may be linked to a robotic arm (15) which controls the movement of the movable element FIG. 2 illustrates an alternative design of the present invention. In this design, the movable element (22) is configured into the shape of a ball point pen. The rolling ball (22a) at the tip of the pen-shape movable element (22) is conductive and is connected to a voltage source (not shown). The internal liquid reservoir of the pen-shaped movable element is filled with a non-conductive liquid (24). The rotation of the conductive rolling ball (22a) causes the release of the non-conductive liquid onto the dielectric surface (20a) of the electrophoretic display panel (20) comprising display cells (25) to create contact between the conductive surface of the pen-shaped movable element and the electrophoretic display panel. An electric field is thus generated between the stationary electrode layer (21) and the conductive surface of the pen-shaped movable element (22).

When the movable element is moved to a desired location, an electric signal triggers the release of a predetermined amount of the non-conductive liquid (14) from the conductive tip of (12a) of the movable element. The distance between the conductive end (12a) of the movable element and the dielectric surface of the electrophoretic display panel may be controlled to be less than the size of the non-conductive liquid droplet released. As a result, the droplet (16) of the non-conductive liquid released will come in contact with both the conductive tip of the movable element (12) and the dielectric surface of the electrophoretic display panel (10). As soon as the contact is established, the voltage difference between the stationary electrode layer (11) and the conductive tip of the movable element (12) forms an electric field sufficient to drive the charged pigment particles in the electrophoretic display panel.

The droplet of the non-conductive liquid can be deposited on the spot where the droplet is released. The droplet may be withdrawn back into the movable element after the contact is no longer necessary.

Suitable non-conductive liquids for the purpose of the present invention may be organic fluids that have a high dielectric constant (preferably higher than 5), are incompatible with the dielectric layer, have a reasonable evaporation time if needed, and are non-hazardous to environment at the application dosage. Examples of the non-conductive fluids include, but are not limited to, deionized (DI) water and organic liquids, such as isopropanol and other alcoholic liquids, glycerin or liquids from the propylene glycol monomethyl ether acetate family. Among them, the deionized water and isopropyl alcohol are the more preferred.

Alternatively, the movable element may also be configured into the shape of a fountain pen, with the tip of the fountain pen-shaped movable element being conductive and connected to a voltage source.

Similarly, a calligraphy brash with thin conductive copper wires that are connected to a voltage source may also be used as a movable element to address such an electrophoretic display. The non-conductive fluid can be placed aside separately in an ink fountain or reservoir.

Figure 3:
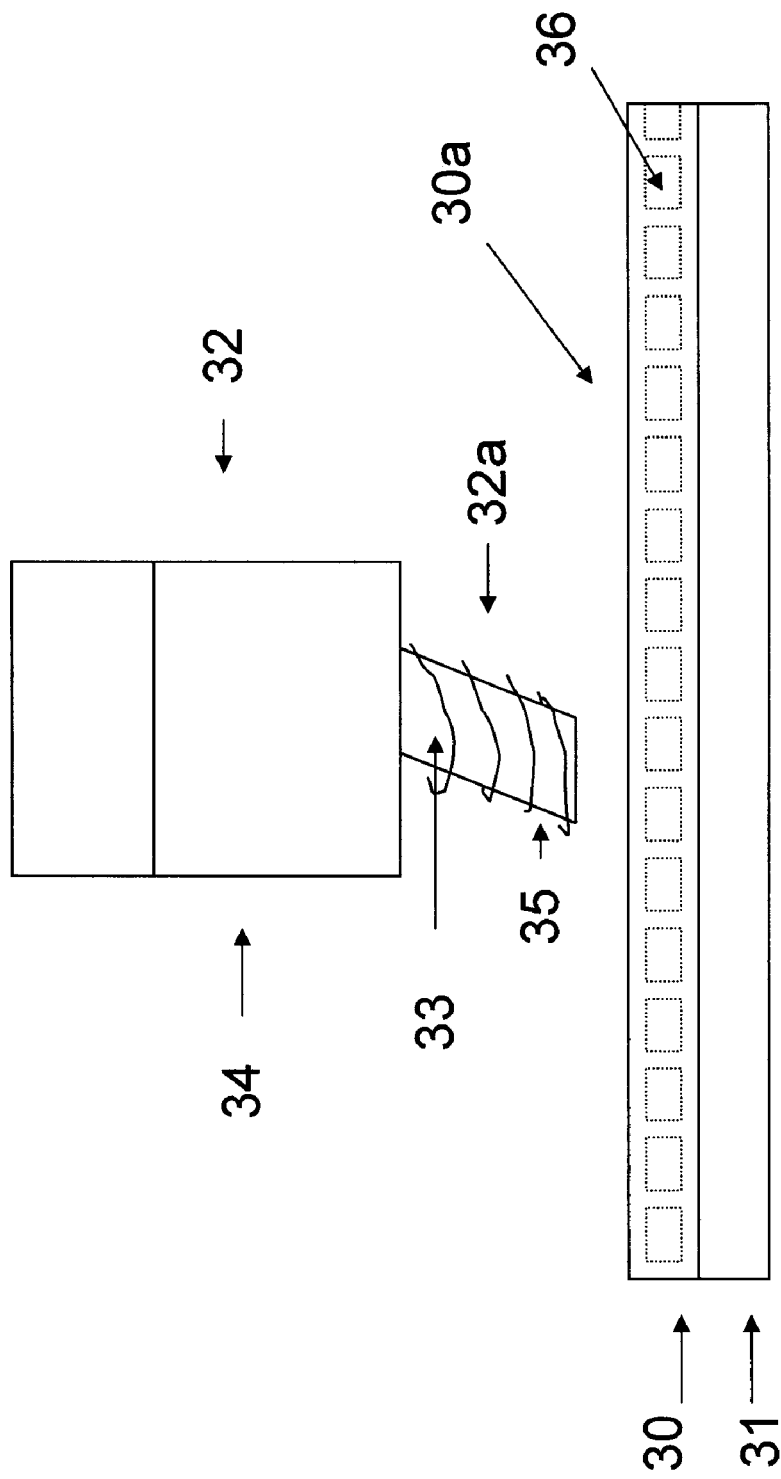

FIG. 3 illustrates another alternative design. In this figure, the movable element (32) has a tip fixture (32a). The tip fixture comprises a dry erasable marker head (33) with conductive wires embodied inside. The dry erasable marker head (33) is preferably formed of a felt material or absorbent foam material. The non-conductive liquid (34) is filled in the body (i.e., reservoir) of the movable element (32), which body is also preferably formed of a felt material or absorbent foam material. During the addressing (i.e., writing) process, the liquid is applied to the dielectric surface (30a) of an electrophoretic display panel (30) comprising display cells (36) through the conductive head (33). Because of the capillary effect of the felt material, the liquid may be continuously drawn and replenished from the reservoir of the movable element through the conductive marker head to be applied to the dielectric surface of the electrophoretic display panel (30). An electric field thus is generated between the stationary electrode layer (31) and the conductive marker head of the movable element (32).

In FIG. 3, the tip fixture (32a) may be spring loaded (35) as shown. In the writing process, the conductive marker head needs to be in contact with the dielectric surface of the display panel. However in order to avoid scratch of the display panel surface, spring(s) (35) are used to better control the contact pressure.

Figure 4:
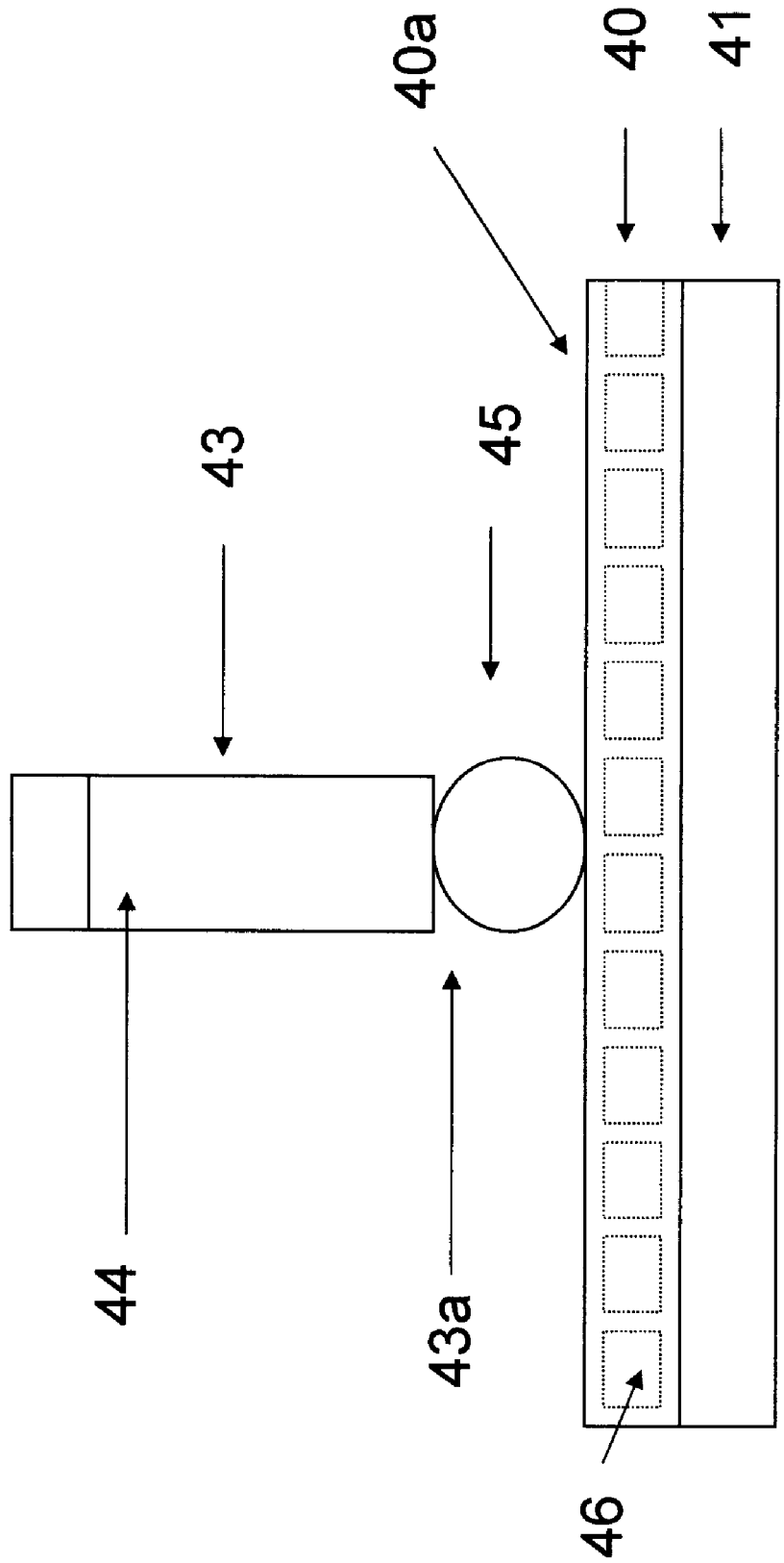

FIG. 4 illustrates a further alternative design. In this design, a movable inkjet printer is used to address the electrophoretic display. The display panel (40) comprising display cells (46) has a dielectric surface (40a) and a stationary electrode layer (41). The piezo inkjet nozzles (43) are filled with the non-conductive liquid (44). The tips (43a) of the nozzles (43) are conductive and are connected to a voltage source. The nozzles (43) are placed at a predetermined distance from the electrophoretic display panel. The distance between the tips of the nozzles and the display panel is shorter than the vertical diameter of the droplet of the non-conductive liquid released. When a droplet of the non-conductive liquid is formed at the conductive tip of a nozzle, the droplet (45) is in contact with the dielectric surface of the electrophoretic display panel (40), thus forming the necessary electrical field between the stationary electrode layer (41) and the conductive tip of the nozzles to cause particle movement in the electrophoretic display panel at the area of contact.

Figure 5:
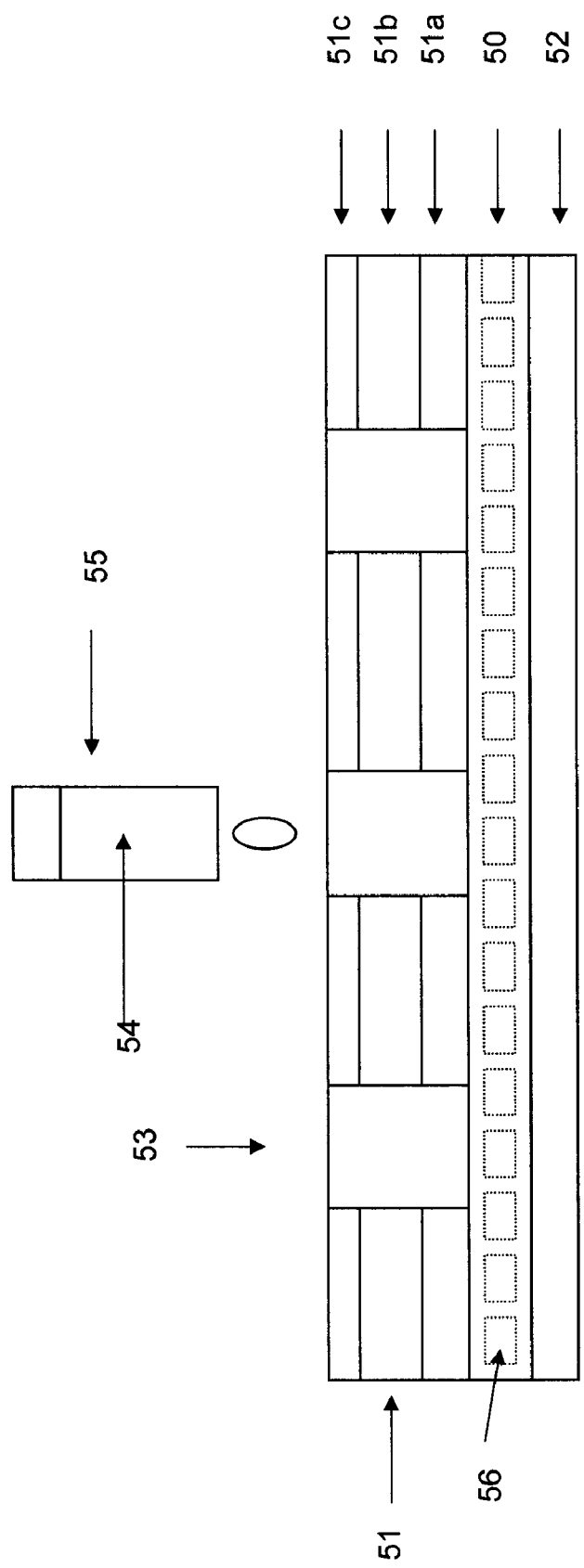

FIG. 5 illustrates an alternative method of using inkjet printing to address an electrophoretic display. The electrophoretic display, in this case, has a common electrode layer (52), an electrophoretic display panel (50) comprising display cells (56) and a stationary electrode (51). The stationary electrode layer (51) has patterned openings (53). The common electrode layer (52) and the stationary electrode (51) are connected to different polarities of the same voltage source. The stationary electrode (51) comprises a first insulating layer (51a), a conductive layer (51b) and a second insulating layer (51c). One of the insulating layers (51a) is in contact with the electrophoretic display panel (50) as shown in FIG. 5.

During the non-contact phase, the insulating layer (51a) in contact with the electrophoretic display panel and the air inside the openings (53) would keep the electrical circuit open. However, when the reservoir (e.g., inkjet nozzle) (55) dispenses the non-conductive liquid (54) into the openings, the liquid, in contact with the surface of the electrophoretic display panel and the conductive layer (51b) in the stationary electrode, forms an electric field path between the inkjet nozzle and the common electrode layer (52). The electric field formed causes movement of the charged pigment particles in the electrophoretic display panel to form an image. In this design, the conductive layer may be formed of a metal wire mesh or thin copper foil and the openings may be formed by means of punching, laser cutting or the like.

In the design of FIG. 5, the writing side can be either the viewing side or the non-viewing side. If the stationary electrode (51) is non-transparent, the writing may be performed on this non-viewing side. However, if the stationary electrode (51) is transparent, the side of the stationary electrode may be the viewing side and the writing is then performed on the viewing side. This also applies to other designs of the present invention. In other words, the present invention provides the flexibility that the writing can be performed on either the viewing side or the non-viewing side.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. An electrophoretic display, which comprises:
   a) a movable element having at least a conductive surface or tip;
   b) a stationary electrode;
   c) a display panel which comprises a dielectric surface and display cells filled with an electrophoretic fluid and said display panel is positioned between the movable element and the stationary electrode; and
   d) a non-conductive liquid capable of establishing contact between the dielectric surface of said display panel and said conductive surface or tip of the movable element.

2. The electrophoretic display of claim 1 wherein said display cells are microcup-based display cells.

3. The electrophoretic display of claim 1 wherein said movable element is a movable electrode.

4. The electrophoretic display of claim 1 wherein said movable element has the configuration of a ball point pen, a fountain pen or a calligraphy pen with a conductive tip or conductive wire at the vicinity of the tip of the pen.

5. The electrophoretic display of claim 1 wherein said movable element has a conductive marker head and at least one spring loaded tip fixture.

6. The electrophoretic display of claim 1 wherein said movable element is an inkjet printer with a conductive tip.

7. The electrophoretic display of claim 1 wherein said non-conductive liquid is de-ionized water or an organic liquid.

8. The electrophoretic display of claim 7 wherein said non-conductive liquid is an orgianic liquid and said organic liquid is an alcoholic liquid, glycerin or a liquid selected from the propylene glycol monomethyl ether acetate series.

9. The electrophoretic display of claim 8 wherein said organic liquid is an alcoholic liquid and said alcoholic liquid is isopropyl alcohol.

10. The electrophoretic display of claim 1 wherein said non-conductive liquid has a dielectric constant of above 5.

11. A method for addressing an electrophoretic display, which method comprises
   i) providing an electrophoretic display of claim 1; and
   ii) releasing the non-conductive liquid to establish contact between the conductive surface or tip of the movable element and the dielectric surface of the display panel.

12. An electrophoretic display, which comprises:
   a movable reservoir containing a non-conductive liquid;
   a display panel which comprises display cells filled with an electrophoretic fluid and said display panel is sandwiched between a common electrode layer and a stationary electrode layer and said stationary electrode layer comprises openings and faces the movable reservoir.

13. The electrophoretic display of claim 12 wherein said stationary electrode layer comprises a conductive layer sandwiched between two insulating layers.

14. The electrophoretic display of claim 12 wherein said non-conductive liquid is de-ionized water or an organic liquid.

15. The electrophoretic display of claim 14 wherein said non-conductive liquid is an organic liquid and said organic liquid is an alcoholic liquid, glycerin or a liquid selected from the propylene glycol monomethyl ether acetate series.

16. The electrophoretic display of claim 15 wherein said organic liquid is an alcoholic liquid and said alcoholic liquid is isopropyl alcohol.

17. A method for addressing an electrophoretic display, which method comprises
   i) providing an electrophoretic display of claim 12; and
   ii) releasing the non-conductive liquid into the openings in the stationary electrode layer.

* * * * *